(12) United States Patent
Costa

(10) Patent No.: US 9,301,649 B2
(45) Date of Patent: Apr. 5, 2016

(54) SHARPENED EDGE SPATULA DEVICE

(71) Applicant: Laerte X. Costa, Azusa, CA (US)

(72) Inventor: Laerte X. Costa, Azusa, CA (US)

( * ) Notice: Subject to any disclaimer, the term of this patent is extended or adjusted under 35 U.S.C. 154(b) by 172 days.

(21) Appl. No.: 13/917,987

(22) Filed: Jun. 14, 2013

(65) Prior Publication Data

US 2014/0366384 A1    Dec. 18, 2014

(51) Int. Cl.
*A47J 43/28* (2006.01)

(52) U.S. Cl.
CPC ..................... *A47J 43/288* (2013.01)

(58) Field of Classification Search
CPC ........ A47J 43/288; A47J 43/28; A47J 43/283
USPC ............. 30/114, 136, 353, 356; D7/688, 692, D7/693, 696
See application file for complete search history.

(56) References Cited

U.S. PATENT DOCUMENTS

| | | | | |
|---|---|---|---|---|
| 725,628 | A * | 4/1903 | Ressler | 294/7 |
| 891,871 | A * | 6/1908 | Smith | A47L 13/08 15/236.01 |
| D67,749 | S * | 7/1925 | Faust | D8/76 |
| 1,668,478 | A * | 5/1928 | Anderson | 30/280 |
| 1,752,129 | A * | 3/1930 | Watson | B26B 23/00 30/308.3 |
| 1,881,604 | A * | 10/1932 | Hull | 172/381 |
| 2,285,013 | A * | 6/1942 | Burns | B26B 3/00 30/165 |
| D145,004 | S * | 6/1946 | Browne et al. | D7/682 |
| D156,503 | S * | 12/1949 | Grancell | D7/692 |
| 2,502,982 | A | 4/1950 | Norman | |
| 2,538,154 | A | 1/1951 | Hannigan | |
| D180,248 | S * | 5/1957 | Spilman | D7/688 |
| D188,618 | S * | 8/1960 | Latham | D7/692 |
| 2,994,553 | A * | 8/1961 | Banton | 294/106 |
| 3,599,255 | A * | 8/1971 | Carroll, Sr. | 7/138 |
| 3,845,798 | A * | 11/1974 | Palumbo | B26B 23/00 30/308.1 |
| 3,877,143 | A * | 4/1975 | Montesi | 30/114 |
| 4,114,265 | A | 9/1978 | Bailey | |
| D270,654 | S * | 9/1983 | Barrett | D22/117 |
| D275,065 | S * | 8/1984 | Steiner | D7/688 |
| 4,548,248 | A * | 10/1985 | Riemann | 81/22 |
| 4,817,221 | A * | 4/1989 | Ryan | B25F 1/02 30/123.7 |
| 4,817,229 | A * | 4/1989 | Sedillo | E04F 21/165 15/144.1 |
| 4,847,998 | A | 7/1989 | Colozzi et al. | |
| D316,213 | S * | 4/1991 | Skerker et al. | D7/696 |
| D363,860 | S * | 11/1995 | Gallo | D7/673 |
| 7,409,764 | B2 | 8/2008 | Akopyan | |
| D632,143 | S | 2/2011 | Geborek | |
| D632,530 | S * | 2/2011 | Lion et al. | D7/649 |
| D673,012 | S * | 12/2012 | Holding et al. | D7/692 |
| 2014/0366384 | A1 * | 12/2014 | Costa | A47J 43/288 30/123 |

FOREIGN PATENT DOCUMENTS

GB         1172495        * 12/1969

* cited by examiner

*Primary Examiner* — Hwei C Payer

(57) ABSTRACT

A sharpened edge spatula device facilitates food preparation and serving by providing a spatula device having a sharpened edge. The device includes a handle and a head coupled to and extending from the handle. The head has a first edge, a second edge, and a pair of side edges extending between the first edge and the second edge. The side edges taper extending from the first edge to the second edge and the first edge is sharpened.

6 Claims, 3 Drawing Sheets

SHARPENED EDGE SPATULA DEVICE

BACKGROUND OF THE DISCLOSURE

Field of the Disclosure

The disclosure relates to spatula devices and more particularly pertains to a new spatula device for facilitating food preparation and serving by providing a spatula device having a sharpened edge.

SUMMARY OF THE DISCLOSURE

An embodiment of the disclosure meets the needs presented above by generally comprising a handle and a head coupled to and extending from the handle. The head has a first edge, a second edge, and a pair of side edges extending between the first edge and the second edge. The side edges taper extending from the first edge to the second edge and the first edge is sharpened.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
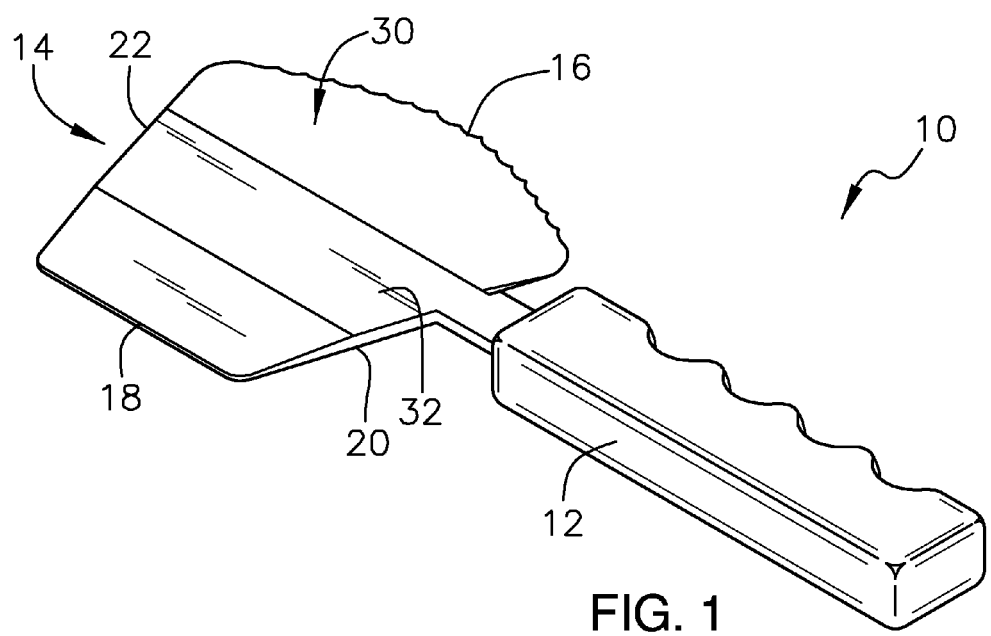
FIG. 1 is a bottom back side perspective view of a sharpened edge spatula device according to an embodiment of the disclosure.
Figure 2:
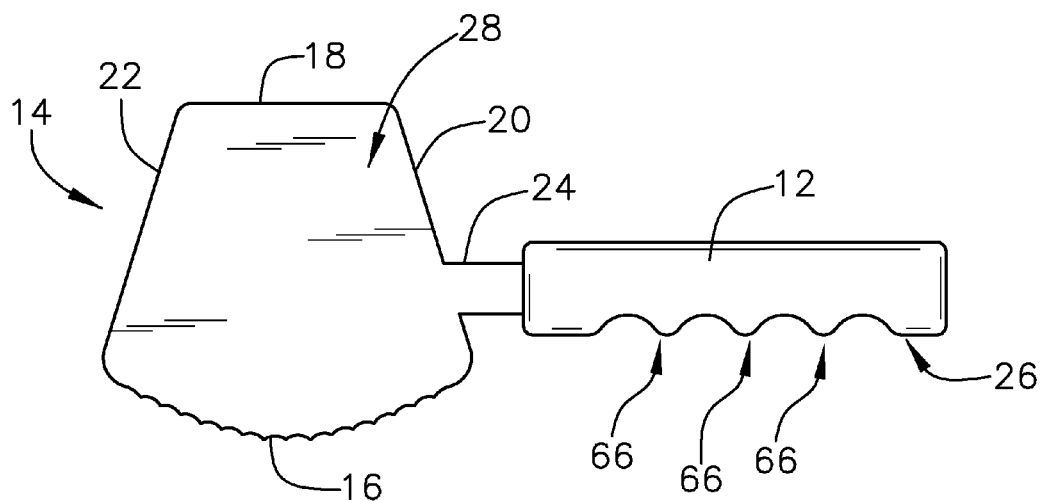
FIG. 2 is a side view of an embodiment of the disclosure.
Figure 3:
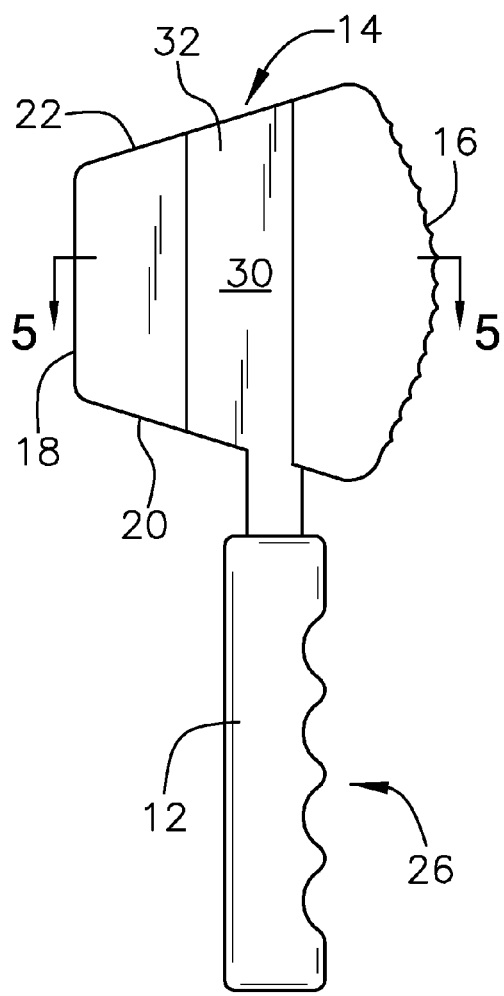
FIG. 3 is a side view of an embodiment of the disclosure.
Figure 4:
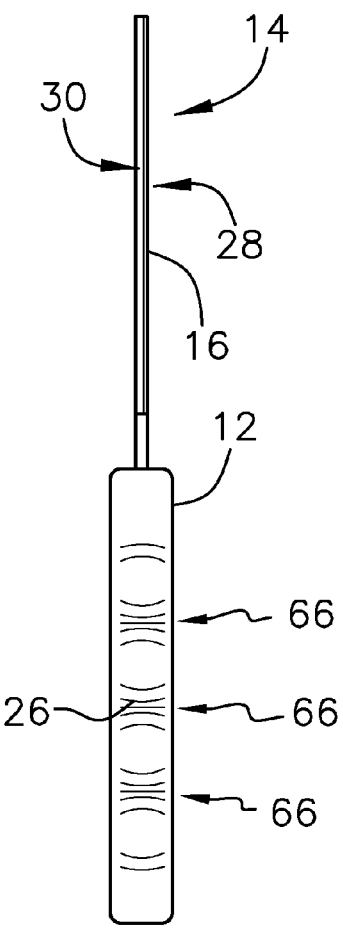
FIG. 4 is a front view of an embodiment of the disclosure.
Figure 5:
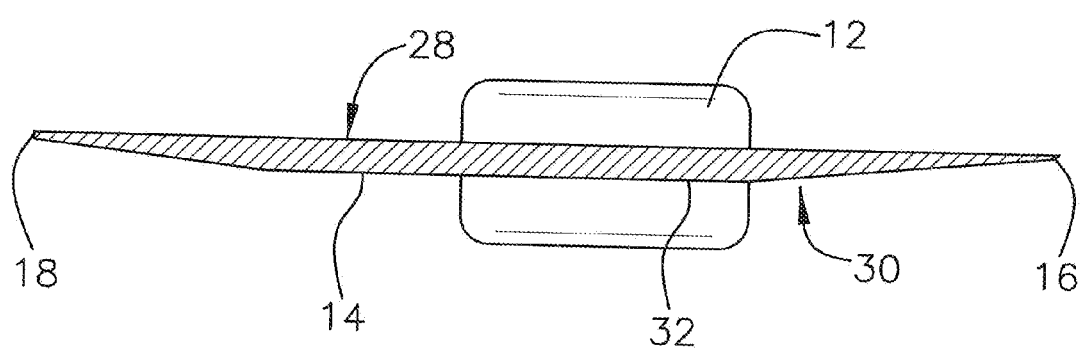
FIG. 5 is a cross-sectional view of an embodiment of the disclosure taken along line 5-5 of FIG. 3.

With reference now to the drawings, and in particular to FIGS. 1 through 5 thereof, a new spatula device embodying the principles and concepts of an embodiment of the disclosure and generally designated by the reference numeral 10 will be described.

As best illustrated in FIGS. 1 through 5, the sharpened edge spatula device 10 generally comprises a handle 12 and a head 14 coupled to and extending from the handle 12. The head 14 has a first edge 16, a second edge 18, and a pair of side edges 20,22 extending between the first edge 16 and the second edge 18. The side edges 20,22 taper extending from the first edge 16 to the second edge 18. The first edge 16 is sharpened and may be serrated. The first edge 16 may also be convex. The second edge 18 may be straight.

The handle 12 is elongated and may have a substantially rectangular cross-sectional transverse shape. A proximal end 24 of the handle 12 relative to the head 14 is coupled to one of the side edges 20 of the head 14. A plurality of ridges 66 may be formed in spaced relationship along a forward edge 26 of the handle 14.

A first face 28 of the head 14 is planar. A second face 30 of the head 14 has a planar medial section 32 parallel to the first face 28. The second face 30 may further taper extending towards the first face 28 approaching the first edge 16 of the head 14. The second face 30 of the head 14 may also taper extending towards the first face 28 approaching the second edge 18 of the head 14.

The first edge 16 may have a length between 15 and 30 centimeters. Each side edge 20,22 may have a total length between 12 and 22 centimeters. Side edge 20 may have a length between the second edge 18 and the handle 12 between 8 and 15 centimeters. The second edge 18 may have a length between 9 and 16 centimeters.

In use, the sharpened first edge 16 may be used to slice food items such as cake or the like. The shape of the head 14 as described above allows the head to be used as a spatula to lift and serve food items as desired.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A sharpened edge spatula device comprising:
   a handle; and
   a head coupled to and extending from said handle, said head having a first edge, a second edge, and a pair of side edges extending between said first edge and said second edge, said side edges tapering extending from said first edge to said second edge, said first edge being sharpened, said first edge being convexly arcuate, said second edge being straight, a first face of said head being planar, a second face of said head tapering towards said first face approaching said second edge of said head.

2. The device of claim 1, further comprising a proximal end of said handle being coupled to one of said side edges of said head.

3. The device of claim 1, further comprising a plurality of ridges extending in spaced relationship along a forward edge of said handle.

4. The device of claim 1, further comprising said sharpened first edge of said head being serrated.

5. The device of claim 1, further comprising said second face of said head tapering towards said first face approaching said first edge of said head.

6. A sharpened edge spatula device comprising:

a handle;

a head coupled to and extending from said handle, said head having a first edge, a second edge, and a pair of side edges extending between said first edge and said second edge, said side edges tapering extending from said first edge to said second edge, said first edge being sharpened, said sharpened first edge of said head being serrated, said first edge being convexly arcuate, said second edge being straight;

a proximal end of said handle being coupled to one of said side edges of said head;

a plurality of ridges extending in spaced relationship along a forward edge of said handle;

a first face of said head being planar; and a second face of said head tapering towards said first face approaching said first edge of said head, said second face of said head tapering towards said first face approaching said second edge of said head.

* * * * *